(12) United States Patent
Geylani

(10) Patent No.: US 11,651,437 B2
(45) Date of Patent: May 16, 2023

(54) METHODS AND SYSTEMS FOR CONTINUOUS RISK MONITORING AND DYNAMIC UNDERWRITING PRICING

(71) Applicant: Virtual i Switzerland AG, Zurich (CH)

(72) Inventor: Veysel Sinan Geylani, Ras Al Khaimah (AE)

(73) Assignee: Virtual i Switzerland AG, Zürich (CH)

( * ) Notice: Subject to any disclaimer, the term of this patent is extended or adjusted under 35 U.S.C. 154(b) by 0 days.

(21) Appl. No.: 16/632,311

(22) PCT Filed: Jul. 16, 2018

(86) PCT No.: PCT/IB2018/055264
§ 371 (c)(1),
(2) Date: Jan. 17, 2020

(87) PCT Pub. No.: WO2019/016685
PCT Pub. Date: Jan. 24, 2019

(65) Prior Publication Data
US 2020/0234379 A1 Jul. 23, 2020

Related U.S. Application Data

(60) Provisional application No. 62/534,125, filed on Jul. 18, 2017.

(51) Int. Cl.
| | | |
|---|---|---|
| G06Q 40/08 | (2012.01) | |
| G06F 30/20 | (2020.01) | |
| G01D 21/02 | (2006.01) | |
| G06F 7/00 | (2006.01) | |
| G06Q 10/067 | (2023.01) | |
| G06F 111/18 | (2020.01) | |

(52) U.S. Cl.
CPC ............ *G06Q 40/08* (2013.01); *G01D 21/02* (2013.01); *G06F 7/00* (2013.01); *G06F 30/20* (2020.01); *G06Q 10/067* (2013.01); *G06F 2111/18* (2020.01)

(58) Field of Classification Search
CPC ........................................ G06Q 40/08
USPC ............................................. 705/4
See application file for complete search history.

(56) References Cited

U.S. PATENT DOCUMENTS

| | | | |
|---|---|---|---|
| 9,505,494 B1 * | 11/2016 | Marlow | G05D 1/0094 |
| 9,563,201 B1 | 2/2017 | Tofte et al. | |
| 9,625,266 B1 * | 4/2017 | Chintakindi | G01C 21/3484 |
| 9,656,606 B1 * | 5/2017 | Vose | G01S 19/42 |
| 9,940,834 B1 * | 4/2018 | Konrardy | G08G 1/165 |
| 10,137,984 B1 * | 11/2018 | Flick | G08G 5/0056 |

(Continued)

OTHER PUBLICATIONS

Insurance Issues for Energy Risk—IEEE (Year: 2006).*

(Continued)

*Primary Examiner* — Bruce I Ebersman
(74) *Attorney, Agent, or Firm* — Fish & Richardson P.C.

(57) ABSTRACT

A system that includes a calculation unit configured to receive an input derived from data measured from a sensor located in a first location, the calculation unit is configured to determine a value for a risk premium. The system includes a storage unit to store the input; and an output unit configured to receive information based on the value determined by the calculation unit and outputs a graphical representation to a display device. The system is at a second location different from the first location.

8 Claims, 13 Drawing Sheets

(56) References Cited

U.S. PATENT DOCUMENTS

| | | | |
|---|---|---|---|
| 10,163,164 B1* | 12/2018 | Tofte | G01C 11/02 |
| 10,282,785 B1* | 5/2019 | Yager | G06Q 30/02 |
| 10,324,463 B1* | 6/2019 | Konrardy | G05D 1/0278 |
| 10,357,195 B2* | 7/2019 | Beck | G16H 50/30 |
| 10,395,332 B1* | 8/2019 | Konrardy | G01S 19/485 |
| 10,410,291 B1* | 9/2019 | Binion | G06Q 40/08 |
| 10,417,914 B1* | 9/2019 | Vose | G08G 1/0129 |
| 10,630,723 B1* | 4/2020 | Prasad | H04L 63/166 |
| 2008/0065427 A1* | 3/2008 | Helitzer | G16Z 99/00 705/4 |
| 2008/0250869 A1 | 10/2008 | Breed et al. | |
| 2009/0265193 A1* | 10/2009 | Collins | G06Q 30/0185 901/46 |
| 2013/0018677 A1* | 1/2013 | Chevrette | G06Q 40/08 705/4 |
| 2014/0310162 A1 | 10/2014 | Collins | |
| 2015/0025917 A1* | 1/2015 | Stempora | G02B 27/0093 705/4 |
| 2015/0378574 A1 | 12/2015 | Gallo et al. | |
| 2016/0104250 A1 | 4/2016 | Allen et al. | |
| 2017/0061547 A1 | 3/2017 | Borden et al. | |
| 2018/0158147 A1* | 6/2018 | Crabtree | G06Q 30/0202 |
| 2019/0325541 A1* | 10/2019 | Simpson | G06Q 50/205 |
| 2019/0384870 A1* | 12/2019 | Shiraishi | G06F 30/20 |
| 2021/0342869 A1* | 11/2021 | Simpson | G06Q 40/06 |

OTHER PUBLICATIONS

IoT enabled Insurance Ecosystem—Possibilities Challenges and Risks (Year: 2015).*

Smart Insurance System Model Concept for Marine Cargo Business IEEE 2021 (Year: 2021).*

Beyond mobile: research topics for upcoming technologies in the insurance industry IEEE 2003 (Year: 2003).*

International Search Report/Written Opinion issued by Australia Patent Office dated Oct. 26, 2018, 14 pgs.

International Preliminary Report on Patentability in International Appln. No. PCT/IB2018/055264, dated Jan. 30, 2020, 9 pages.

Extended European Search Report in European Appln No. 18834425.3, dated Dec. 1, 2020, 6 pages.

Search Report in Singapore Appln. No. 11202001433T, dated Jul. 19, 2021, 13 pages.

Office Action in European Appln. No. 18834425.3, dated Jan. 11, 2023, 13 pages.

* cited by examiner

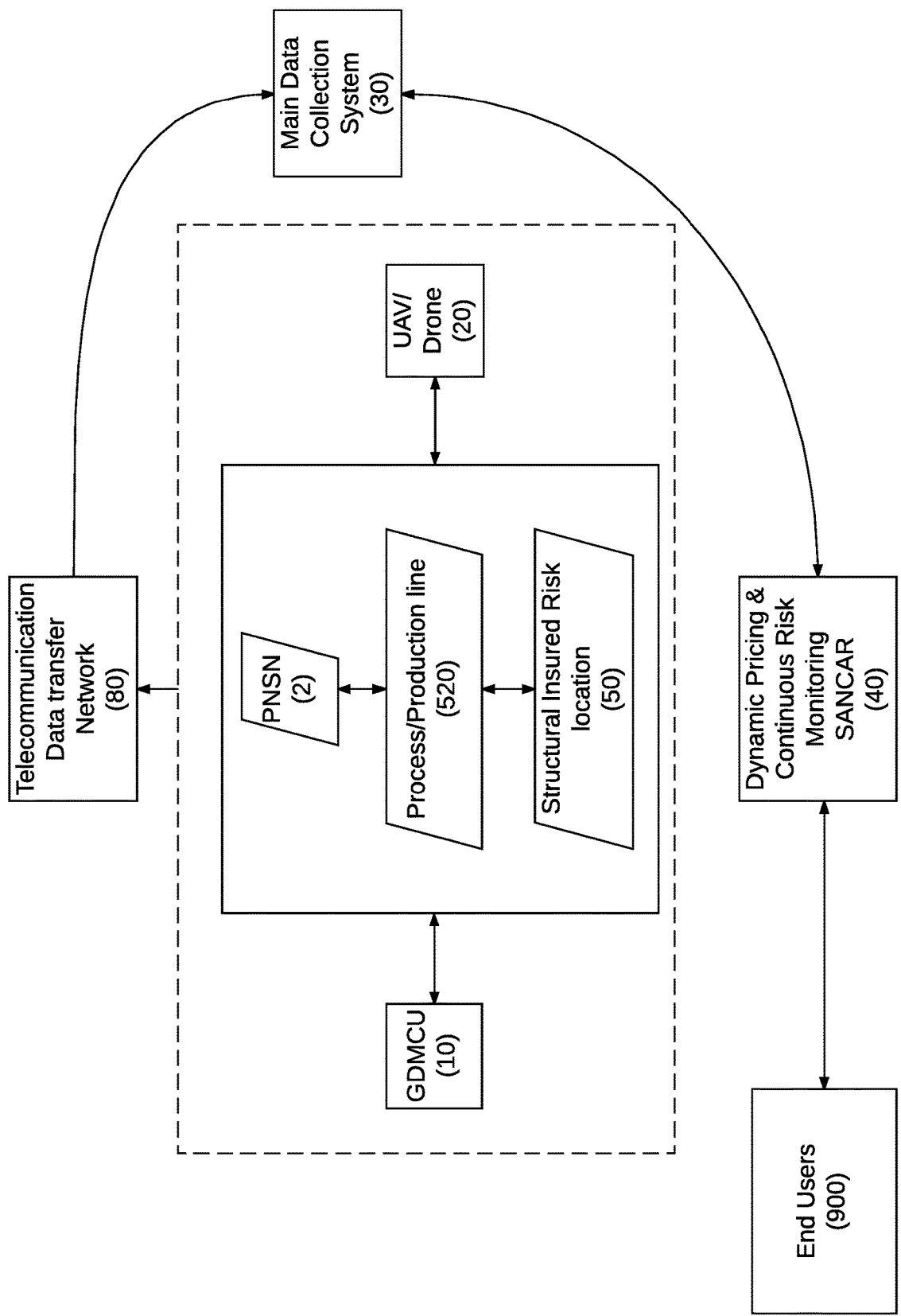

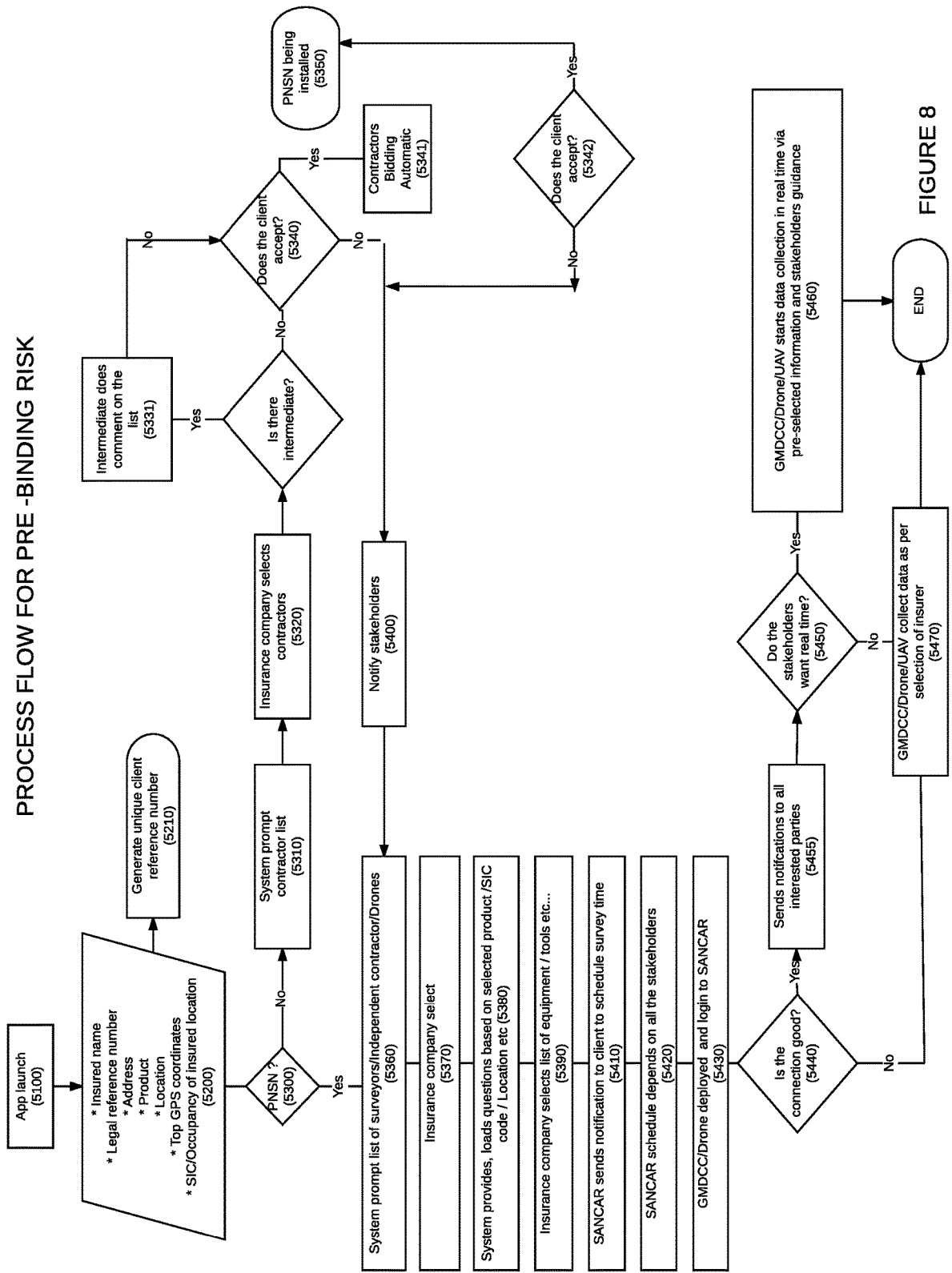

METHODS AND SYSTEMS FOR CONTINUOUS RISK MONITORING AND DYNAMIC UNDERWRITING PRICING

CROSS-REFERENCE TO RELATED APPLICATIONS

This application is a National Stage Application under 35 U.S.C. § 371 and claims the benefit of International Application No. PCT/IB2018/055264, filed on Jul. 16, 2018, which claims the benefit under 35 U.S.C. § 119(e) of U.S. Provisional Application No. 62/534,125, filed on Jul. 18, 2017. The disclosures of the prior applications are considered part of and are incorporated by reference in the disclosure of this application.

BACKGROUND

This specification relates to insurance risk monitoring and dynamic underwriting pricing.

Current insurance practices for risk monitoring/surveying involve discrete and/or manual data collection processes, mainly involving written report and pictures. These surveys generally occur once a year before a policy is renewed. Thereafter, both the insurance company and the insured party have limited monitoring capability of the risks. While the risk is a continuous stochastic process, the risk transfer and monitoring is a discrete process. This approach limits the adequate and fair risk transfer between both the insurer and the insured, and both parties can benefit in the long term from better insurance risk monitoring.

SUMMARY

The methods and systems disclosed herein related to continuous risk monitoring and dynamic underwriting system for insurers. This system incorporates an interactive platform not only for insurance companies but also for other stake holders in the insurance ecosystem—clients, loss adjusters, risk engineering, brokers, agencies, captives and third party developers. The methods and systems disclosed herein allow continuous risk monitoring of insured risks and allows the underwriting premium to be reasonably calculated for each risk.

An insurance contract is between the insurer and insured (i.e., client). Insurance policies most of the cases are issued based on the insured declaration. Generally, insurance companies or intermediaries (brokers/agents) send internal or third party risk surveyors to the client's premise to survey the risk. Relying on the insured party's declaration may create a potential moral hazard and asymmetric information problem. Moral hazard refers to the lack of incentive to guard against risk when the insured is protected from its consequences. In the event of a loss, settlement of an insurance claim generally takes time because of the inherent asymmetric information and moral hazard concerns from the perspective of the insurance companies. To mitigate this moral hazard problem, insurance companies rely on uncorrelated and non-aggregation concept of big numbers, significant reinsurance, and retrocession agreements.

Another significant issue is the pricing of each risk. There are various actuarial models to calculate the adequate or technical premium for individual risks. However, considering the limitation in available data and potential complexity of the risks, generalized linear models and other conventional models may not offer accurate pricing for the risks. The premium calculation for particular risk is divided into sub categories. First of all, the overall portfolio includes experienced or estimated insurance claim cost, loss adjustment costs, transactional costs (intermediary fees/commission) and general operational expenses. In this approach, the premium is calculated from the portfolio level to an individual risk. The adjustments on premiums are done for each specific risk. Deviation option from the technical pricing can reach up to 80% level, which can challenge the validity of the technical pricing concept for the risk.

Since the portfolio based pricing models may not provide an accurate premium pricing for the individual risk, insurance companies need a decision making process for risk selection. To solve this issue and make the adjustments on the model generated premiums insurance, insurers may employ underwriters. However, these adjustment decisions are exposed to standard principal agent problems, and there is no significant downside (lack of legal proceedings, lack of close monitoring of the track record of individual underwrites, etc.) of the decisions for underwriters. Therefore, in the long term, the benefit of human/underwriter's decision for insurance risks may provide only limited added value to insurance companies to find the accurate premium per risk. The technological infrastructure related limitations can also limit accurate risk pricing. Instead, the premium calculation is automatically adjusted by supply and demand, together with the market historical loss experiences in specific lines of business. This supply and demand equilibrium may not provide a particular risk premium estimate for a specific risk.

The methods and systems disclosed herein account for the incentives insurance companies have in considering the amount of potential paid losses. The disclosed system can include independent third party developers, scientists and contractors to capture data related to the underwriting and claims. The methods and system can avoid the problem of the insured parties not wishing to purchase assets or use hardware equipment and software to capture the data for assessing individual risk.

Improvements to risk mitigation can the subsequent impact on premiums may also be hard to monitor from the client level. They may not clearly see the immediate financial benefit and insurance premium saving benefit of any risk mitigation improvement. On the other hand, generally, they may only have a limited idea about the methods and systems to improve their risk, and to decrease the severity level and frequency of losses.

For the insured, the continuity in the operation of the insured risks, and not having a loss can be more important than the claim payments from the insurer. Clients can suffer from loss of market share and lose loyal customers to its competitors when there is disrupted customer service/manufacturing. Help the insured to monitor risks continuously and decrease the probability of having a loss is a goal of the systems and methods disclosed herein. Determination of the policy limits and sub-limits for the policy extensions were previously decided based on intuition and portfolio experience of insurance companies and their brokers. Such an approach can result in over or under insured interests for the clients. The methods and systems disclosed herein can generate mutual benefit for the insurer and the insured.

The insured parties may also not give proper attention to the insurance and risk transfer, as the awareness of the insured party's risk management may be correlated with the insured party's loss experience. Personal insurance line clients typically focus on automobile and medical insurance. On the commercial side, the insured parties typically focus on property insurance. Due to the availability of the insurance capacity and extremely competitive market conditions, clients can generally find an insurance company which will insure her risk. Sometimes they may pay more premium on the insurance to avoid additional workload in completing a pre-binding requirement. The insured party's behavior can be similar to fluid dynamics, because they generally wish to proceed along the path of least resistance. As a result, clients may have limited incentive to complete any additional underwriting information for their one-off insurance policy needs.

Systems and methods disclosed herein allow continuous risk monitoring and dynamic underwriting pricing. Such systems can be used for both commercial and personal insurance products. In some embodiments, the system includes smart devices, other media capturing devices, and sensors. Third party human element may be used to remove potential asymmetric information issues in insurance contracts between the insurer and insured. The system can use devices such as 3D scanner, and other visual media capture equipment to create a 3D modelling of the insured asset or interest in virtual and augmented reality platform in a structured way. This allows detailed automated data analytics to more accurately estimate probable maximum property and business interruption loss scenarios. The system can keep monitoring the insured interest by using continuous data flow which may be provided by neural network at the asset's location, which can include sensors and media (video/audio) capturing equipment. The systems and methods disclosed herein allow insurance companies' underwriting decisions to be more accurate, as it is not restricted by limited captured data.

The systems and methods disclosed herein minimize asymmetric information and moral hazard issues during the risk acceptance process of the insurance policies by using newly available technologies such as smart devices, sensors, virtual reality, augmented reality and 360 degree cameras, etc.

The collected data can be structured in sets of specifically captured media data. The system can display visual format such as augmented reality, 3D simulation, virtual reality, or standard charts upon request of the user, and based on the type of the captured data. The system can continuously analyze the risk profile of insured interest using algorithms that incorporate, for example, artificial intelligence, neural networks, machine learning algorithms.

Licensed third party developers of the system, insurance companies, and other users can access the raw data and algorithm library, and can develop their underwriting, risk monitoring and other tools based on the available captured data and data analysis and algorithm packs. The system provides defined warning signals to the insured parties for the insured interest to ensure undisrupted business continuity and minimizes the value destruction in a disruption.

The insurance industry currently does risk pricing and risk monitoring/surveying based on the discrete decision and data collection. The frequency of this discrete decision process is typically before the policy inception, prior to the policy period. The majority of the policy periods are one year. In many cases, risk monitoring and pricing for each risk is done only once a year. Given the competitive nature of the insurance market and increasing service costs, some insurance companies, for the sake of top line, take bottom line risks and do not conduct a risk engineering/survey for some insurance policies.

The central paradigm of the technological innovation in the insurance industry has been focusing internal issues and may miss the core point—the client's need. The client's primary interest may be business continuity and/or the ability to continue living in the comfort zone of their homes. So, assisting the client to minimize their risk probability by using risk management methods and technologies, and enabling them to continue with their life as usual, can be more important to some customers than saving insurance premium.

The systems and methods disclosed herein shift the paradigm, and create a platform which provides continuous raw data, structured data sets, algorithms, third party developed application database to all stake holders—clients, insurance companies, loss adjusters, risk engineering companies, brokers, agents, third party contractors and third party licensed application developers. This system can enable them to enhance the risk management practice in a continuously evolving cycle by providing incentives to all parties. Considering the complexity in the predictive modelling of loss probabilities, inherent moral hazard, and asymmetric information risks, the system can include human data/signal input to hasten the machine learning process and minimize false signal negative business continuity implications.

Insurance companies, loss adjusters, clients, risk engineering companies, and customers may download the application from cloud or access the system through their terminals. The client will initiate the risk transfer contract process through directly engaging with an insurance company or engaging an intermediary (e.g., agency/broker) through conventional distribution channels. Insurance companies can post risks in the third party risk engineering/surveying companies, individuals (hereinafter "surveyor"), or drones can be the operating contractors (hereinafter "drone") for those registered in the system.

If a client has not been registered in the system and does not have a premise neural sensor Network (hereinafter "PNSN"), then subject to customer approval, a PNSN may be installed at the insured premise. The client, or intermediary, or insurance company can enter SIC (Standard Industrial Code) of the client and location coordinates/addresses. The system can also propose suggested questionnaires, equipment, and devices for surveying each risk and list the available third party engineers registered in the system.

The insurance company can amend the menu of options by adding or removing essential equipment, and questions in the suggested list. Then insurance company can then select/appoint a surveyor. The surveyor can also be a drone that has capabilities, software, and hardware for capturing selected data. The surveyor can follow a defined process even in a confined space. A unique reference number can be created by the system and be sent to the client, insurance company and the surveyor. The surveyor can then go to the locations listed in the system, as prompted. The surveyor and drone can provide real time video streaming to the insurance company and/or a professional risk engineer, or they can capture the data remotely without having real time streaming, but uploading the data to a system database.

This system is developed for both commercial and personal insurance products. An embodiment of the system can include smart devices, other media capturing devices, drones, and sensors. Third party human element can be used to remove issues relating to asymmetric information in an insurance contract between the insurer and insured. The system, by using devices such as 3D scanner, visual media capture equipment, can create a 3D modelling of the insured asset or interest in virtual and augmented reality platform in a structured way. The system can then do detailed automated data analytics to accurately estimate probable maximum losses and business interruption loss scenarios. The system can keep monitoring the insured interest by using continuous data flow which may be provided by asset neural network (PNSN), sensors including media (video/audio) capture equipment.

The data can be structured in sets of specifically captured media data. The system can display visual format such as augmented reality, 3D simulation, virtual reality, or standard charts upon request of the user and/or based on the type of the captured data. The system can continuously analyze the risk profile of insured interest by using algorithms, including but not limited to artificial intelligence, neural network, machine learning algorithms. Licensed third party developers, insurance companies, and other users can access the raw data and algorithm library (whenever sharing is approved by the data owner), and can develop their own underwriting, risk monitoring, and/or other tools based on the available captured data and data analysis and algorithm packs. The system can provide defined warning signals to interest parties for the insured interest to ensure undisrupted business continuity and minimizes the value destruction of existing wealth and assets.

In one aspect, a system that includes a calculation unit configured to receive an input derived from data measured from a sensor located in a first location, the calculation unit is configured to determine a value for a risk premium. The system includes a storage unit to store the input, and an output unit configured to receive information based on the value determined by the calculation unit and outputs a graphical representation to a display device. The system is at a second location different from the first location.

Implementations can include one or more of the following features. The graphical representation can include augmented and virtual reality. The calculation unit can be further configured to compute a simulation to determine a probable maximum loss of insured interest, property damage, or business interruption. The system can further include a processor that is configured to receive the data measured from the sensor and compute an input for the calculation unit. The system can further include a database library; an interface configured to interact with an external developer's platform; a dynamic pricing processor that computes an output based on the value of risk premium; a continuous risk monitoring interface. The sensor can be configured to collect data real-time. The calculation unit can be configured to generate predictive analytical output that reduces a probability of an accident at the first location. The sensor can be configured to generate data relating to one or more of odor, pressure, height, movement, displacement, and gas content. The sensor can include an accelerometer or a gyroscope. The system can include a dynamic pricing unit that receives the value of the risk premium from the calculation unit and generates a daily risk premium based on a parameter of the first location. The sensor can be configured to capture visual data of a structural asset at the first location. The system can include an image processing unit configured to convert the visual data into a measurement of dimensions of the structural asset. The system can include controllers for receiving input from smart devices, and controllers for receiving input from media capturing devices, and sensors. The media capturing devices can include 3D scanner visual media capture equipment. The system can include an output port configured to relay signals to a display device to render 3D modelling of an insured asset in virtual and augmented reality. The smart devices can include one or more of drones, smart glasses, or smart wearable devices. The calculation unit can be configured to perform automated data analytics and to output a probable maximum property and business interruption loss scenarios and premises based casualty exposures.

In another aspect, a method of dynamically determining a risk, the method includes receiving, at a server in a first location, a first set of raw sensor data recorded at a second location; processing the first set of raw sensor data into a first set of processed data; storing the first set of processed data in a database for the second location. The method includes calculating the risk based on the first set of processed data and information from the database; receiving, at the server in the first location, a second set of raw sensor data recorded at the second location; processing the second set of raw sensor data into a second set of processed data; and adjusting the risk based on the second set of processed data, wherein the first location is different from the second location.

Implementations can include one or more of the following features. The method can further include generating a 3D model of the second location based on the processed data. The information from the database can include information based on topography, geological, and/or fault zones. The method can include generating a probable maximum loss model based on the risk. The first set of raw sensor data can be obtained from a premise neural sensors network. The first set of raw sensor data and the second set of raw sensor data can be transferred continuously to a local sensor data collection database. The local sensor data collection database can be relayed to a central database at the first location through satellite or other data transmitting infrastructure. The risk can be used to calculate daily risk premium based on the first set of raw sensor data and the second set of raw sensor data.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A shows a general schematic of the system.
FIG. 8 shows an embodiment of a pre-binding system process.

Like reference symbols in the various drawings indicate like elements.

DETAILED DESCRIPTION

Figure 1B:
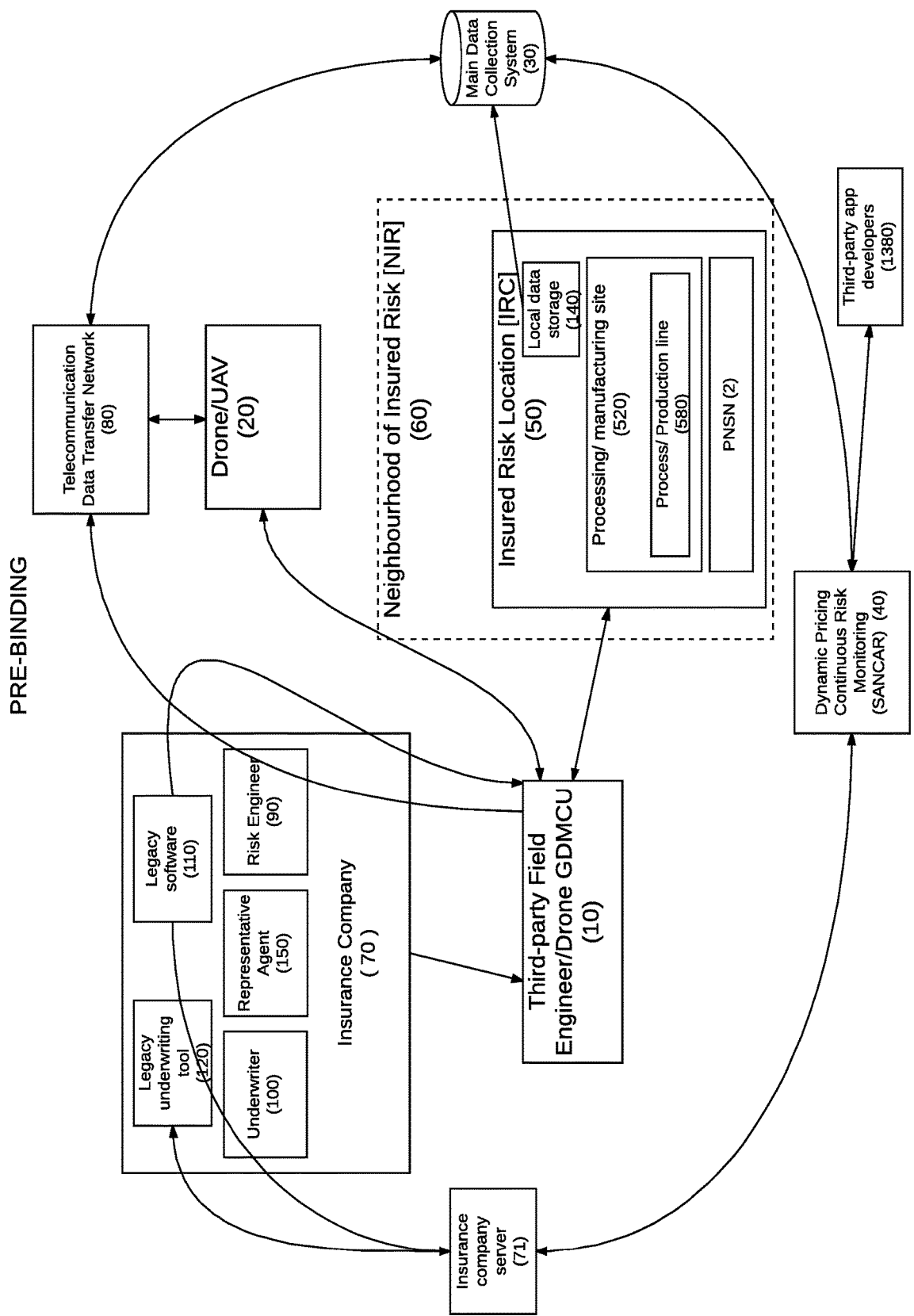
FIG. 1B shows an embodiment of a system for assessing the pre-binding risk.

FIG. 1A shows a schematic diagram of the system implemented at a particular structural insured risk location 50. The location 50 can have a process/manufacturing site 520. The site 520 can include a Premise Neural Sensor Network PNSN 2. A ground mobile data capture/collector unit (GMDCU) 10 and a unit 20 that can include a drone, an unmanned aerial vehicle (UAV), or a similar aircraft can each record, receive, and transmit data. The data is transmitted to a telecommunication data transfer network 80, which relays it to a main data collection system 30. The main data collection system 30 can send relevant information to a dynamic pricing and continuous risk monitoring SANCAR 40. End users 900 can interact with a user interface provided by SANCAR 40.

FIG. 1B illustrates an embodiment of a system and method for use in the pre-binding stage of an insurance contract. There is a ground mobile data capture/collector unit (GMDCU) 10. This unit can include, but is not limited to, a field engineer, loss adjuster, drone, any mobile ground unit that is capable of capturing the required/defined data. A flying mobile data capture (FDCU) unit 20 can include a drone, an unmanned aerial vehicle (UAV), or a similar aircraft. The FDCU can be equipped to capture any required/defined data. An insured risk location 50 is shown schematically. Around the location 50 is a dashed area Neighborhood of the Insured Risk Location 60, which shows the surrounding of the insured asset. Within an insurance company 70, an underwriter 100, a risk engineer 90, a legacy underwriting tool (120), legacy software system 110 of the insurer, an insurance company server 71 can be involved in the pre-binding part of the process. A Dynamic Risk Pricing and continuous monitoring system (hereinafter "SANCAR") 40 is a centralized data processing, transferring and monitoring system.

FIG. 1B shows the data capture and flow of data process within the insurance company. The elements involved in the pre-binding process include the insured's asset (or interest), the premise, sensors, media capture devices, local and cloud located databases, ground mobile data collection unit (e.g., a field engineer or a drone), data/communication transfer intermediaries (satellite, local communication/data transmitting infrastructures), SANCAR, and third party application developers.

Before insuring an interest or an asset, the insurance company underwriter 100, the risk engineer 90 or any other insurance company representative, 150 can launch an application 5000 by logging into SANCAR system at a step S100 (shown in FIG. 8). The insurance company underwriter 100, the risk engineer 90 or any other representative agent 150 can enter the data regarding the insured party at a step S200 (shown in FIG. 8). Data can include an insured name, legal reference number (tax number, trade license number etc.), address, PO Box, location, GPS coordinates, insurance product, SIC/NAICS code of insured business activity in a selected area. Then SANCAR generates a unique client reference number at a step S210 and stores it in memory 3050. SANCAR checks, at a step S300, if the client having the unique reference number has a PNSN (Premise Neural Sensor Network) installed. If SANCAR cannot find a match in the memory 3050, then the system will prompt an approved and registered contractors list at a step S310 (shown in FIG. 8) which can install the PNSN at the insured premise. The insurance company 70 selects the contractor at a step S320 and SANCAR checks at a step S330 if there is any recommended intermediary 4110 (e.g., broker, captive agency, etc.). If there is, then SANCAR send a notification to the intermediary 4110 at a step S331. Intermediary can upload their input to the SANCAR, which then pushes a list of contractors 4130 to the client for approval. If there is no intermediary during checking process 5330, SANCAR will send a list 5310 of the contractors to the customer. The client then reviews the list and decides at a step S340 whether to accept to the installation of PNSN system. If they accept the installation, SANCAR will notify the contractors 4130 and start an automated bidding process 5341. Then bidding results are sent to client and client decides at a step 542 whether to execute the bid. If the customer accepts the installation of the PNSN, the selected contractor will install the PNSN system 5350. If the customer does not allow installation of PNSN, then SANCAR will notify all stakeholders 5400. Then SANCAR will send a prompt 5360 to registered ground mobile data collection contractors —GMDCU (field engineer, drone etc.) and a drone contractor 20. The insurance company 70 selects a GMDCU 5370. SANCAR then populate an interface 5380 with the appropriate applications, questionnaires, data requirement information, etc. from an API database 4050. The Insurance company 70 selects a list 5390 of the required data collection templates and tools. SANCAR sends a notification to the client for scheduling time 5410. The notification can include, but is not limited to, robot call, SMS, email, or any other communication tool. SANCAR then sends a schedule request 5420 to interested party/stakeholders for an inspection time. GMDCU and drone contractor then go to the site and log in via a connection to SANCAR at a step S430. GMDCU and drone contractors check connectivity, bandwidth through API database 4050 of SANCAR and if the connectivity is good enough to do a real time inspection, SANCAR sends a notification at a step S455 to all interested parties (e.g., the insurance company 70, the broker/agent 4110, the risk engineers 4090, etc.).

The interested parties make a decision at a step S450 whether to have a real time data collection. If they decide to have a real time session through SANCAR, they will start to see and guide a data collection process at a step S460 based on pre-selected templates 5390 and the real time guidance of the interested parties. If there is no robust connectivity for real time or interested parties do not want to have real time session, then the GDMCU 10 and the drone contractor 20 follow pre-selected templates and complete the data collection process.

The GDMCU 10 and UAV/drone 20 connect to each other through a base station 2060 to the GDMCU's data transmitter 1070. GDMCU 10 and UAV/drone 20 will follow the approved guidance and template 5390 of the insurance company 70 for a particular risk, and capture the data as per the guidance. The captured data from the GDMCU and UAV can be stored locally data storage unit. This unit can be any type of data storage that enables GDMCU and UAV to store the collected raw data to local storage for a UAV 2040 and GDMCU. If the connectivity is strong enough, transfers this locally stored data to the central database 30 through a local communication and data transmitting basis 80. This local communication data transmitting network can include, but is not limited to, LTE, 4Q satellite, wifi, etc.

This raw data goes to a server 3040 of a main database 30 and a processor 3080 converts this data to processed data and stores in specifically processed sub databases under the main database 30 for future use by applications and algorithms which may be developed and stored in the SANCAR 40.

If there is already PNSN 2 installed at the insured site, then the raw data collected from sensors will flow to the local data storage 140 in the insured risk location 50. From this data storage, the raw data will move to the main database 30, and be processed by processor 3080 into processed data and transferred to sub data base 3070 for the insured risk location.

GDMCU 10 have devices and equipment to capture data defined by the SANCAR. GDMCU can include smart glasses/virtual reality/augmented reality wearables 1020. Through wearable 1020, real time or offline high definition media capturing, audio recording can be done. The insurance company 70 or other interested parties can have real-time video streaming and communication with the GDMCU. The insurance company 70 guides GDMCU through these wearables and they will have structured sensor/3D scanning 1010 devices. With this instrument, GDMCU scans the insured risk location 50 along with all assets within the premise.

Laser pointers or similar pointing devices can mark a particular asset to capture its GPS coordinates. Alternatively, once GDMCU marks a definite asset, laser pointer receiver 2020 installed on the UAV/drone 20 will locate the target and assign GPS to coordinate to that asset image data. GDMCU can collect data also through 360 degree cameras, or, for example, ProjectBeyond© type of camera systems which may enable insurance company 70 or other interested parties to experience, through virtual reality real time, 360-degree observation capability within SANCAR.

GDMCU can also be equipped with smart mobile devices 1040 (e.g., phones, tablets, and similar devices) to get templates from SANCAR system. The required information defined by SANCAR will be populated either in smart mobile devices or smart wearables 1020. The GDMCU can have remote material detection receiver device 1090. The receiver device 1090 is connected to the remote material detection transceiver 2010. When GDMCU points to a particular asset using a laser pointer, the transceiver 2010 which is installed in the UAV. sends a radio signal to that specific asset and/or reflective material. The GDMCU positions receiver 1090 to capture the radio signals that has passed through or reflected from the remote asset, and transceiver 2010 will capture the reflected signals. The raw data is then sent to the local database, which relays this information to base station 2060.

The base station 2060 transfers this data to the SANCAR. Algorithms use the time differences between a first signal and the reflected radio wave signals and/or signals that passed through the specific asset to determine dielectric constants and with other parameters of the specific asset. Third party developers 1380 and other users of the SANCAR can develop their models to estimate the material type and thickness of this asset. This remote material technology can include other technologies like x-rays, neutrons, electromagnetic imaging (e.g., infrared, terahertz, microwave, radar, etc.), electromagnetic (nuclear quadrupole resonance (NQR), nuclear magnetic resonance (NMR), electron spin resonance (ESR), magnetic field), gamma rays, and other electronics (surface acoustic wave, thermo redox, field ion spectrometry, electronic nose, mass spectrometry etc.), chemical and optical detection technologies (transmission, reflection spectroscopy, cavity ringdown spectroscopy, light detection and ranging (LIDAR), differential absorption LIDAR (DIAL), nonlinear optics).

After GDMCU and UAV/drone capture raw visual data of the structural assets, image processing algorithms in the algorithm database 4070 and API database 4050 are used to extract measurement dimensions of the object/asset detection, and GPS coordinates are assigned to each asset. With remote material detection system and image processing, the SANCAR creates a 3D model of the insured. The model can include the dimension, material types of structural assets and their distances to one another.

The embodiments disclosed above for object measurement detection, 3D modelling, GPS mapping, and material detection methods are not limited. Any other technology that enables the system to automatically capture data and information about the insured asset can help the system create a 3D model of the asset with measurements, dimensions, distance, material type, a method of construction, GPS locations, etc. are included.

Figure 7A:
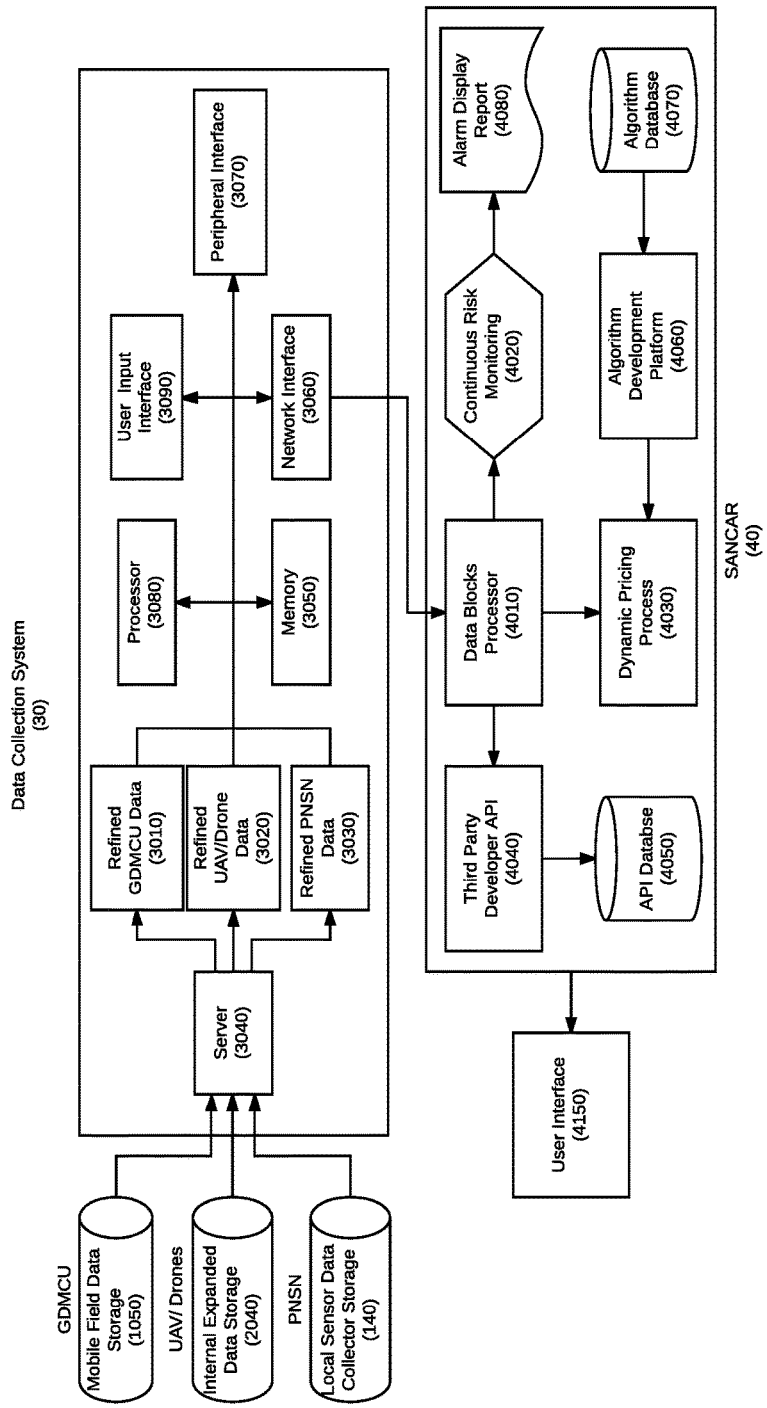
FIG. 7A shows a schematic of raw data collector units, primary data collection system and a Continuous Monitoring & Dynamic Risk Pricing system (hereinafter "SANCAR").
Figure 7B:
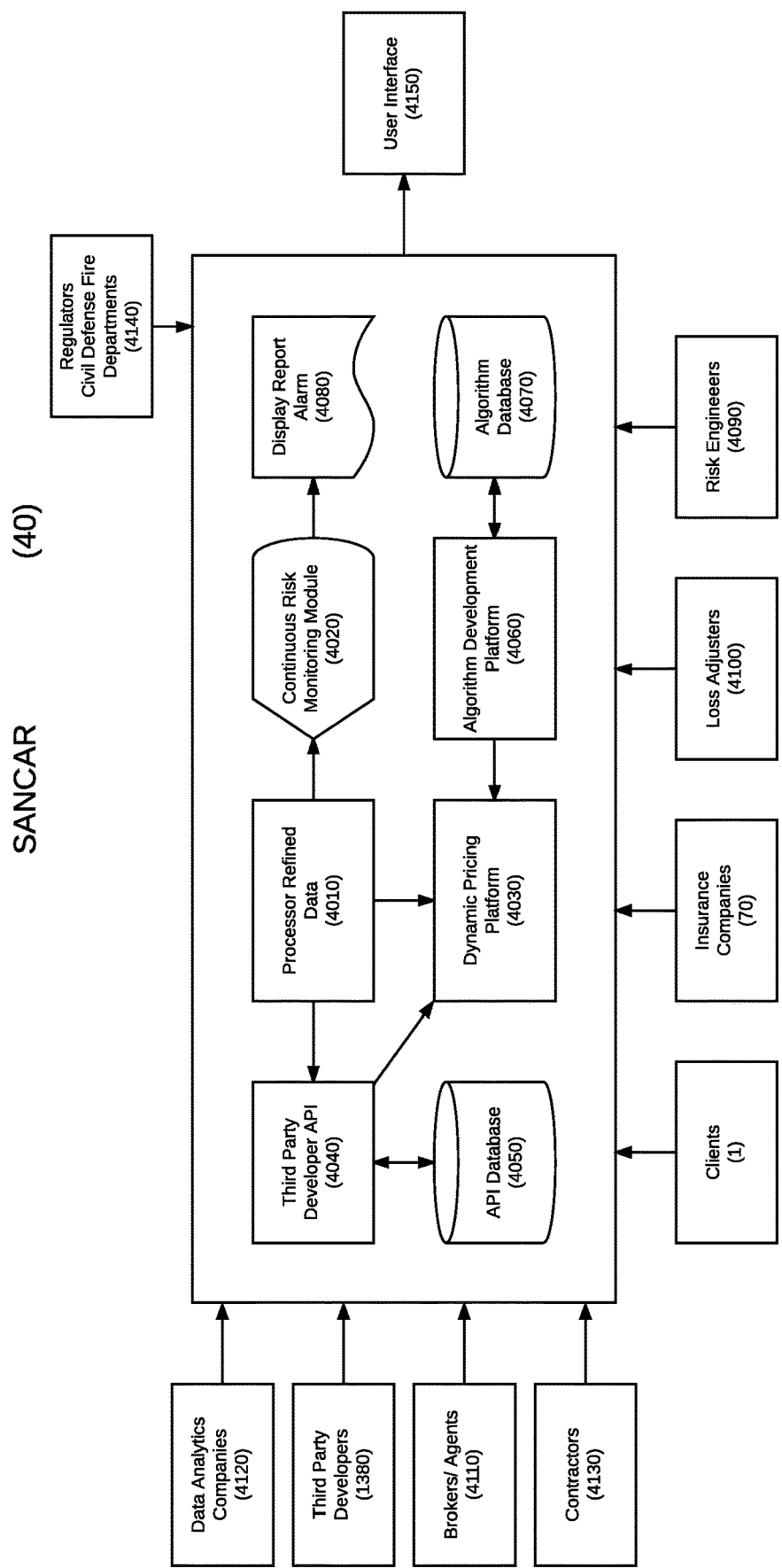
FIG. 7B shows an embodiment of the SANCAR system components and ends users of the system.

After the data capture, end users of the system shown in FIG. 7B can walk through the digital 3D model of the insured asset in virtual reality environment provided by the API database 4050 application. The end users will be able to get the material information, construction data, and distances between the assets in the real environment.

GDMCU and UAV/drone continue with their operation until they complete the structural 3D modelling of the asset. After all data for the structural 3D modelling are captured, GDMCU and UAV/drone can proceed to capture the neighborhood environment visual data up to the limits defined by SANCAR at the beginning of the inspections. Nearby assets along with their GPS coordinates are captured by the GDMCU and UAV/drone. Nearby neighborhood area of the insured data can be analyzed with GIS (geographic information system) software. The algorithm database 4070 of the SANCAR can include such software, allowing SANCAR to calculate and simulate for earthquakes, flood flows, or wind flows that may affect the insured premise based on the collected data. This data also includes topography, geological, fault zones and similar available data sets to make accurate simulations of the incidents and the likely impact on the insured asset.

GDMCU will also ask pre-defined questions 5070 to the insured party's operational team. The questions 5070 can include, but is not limited to, the construction history of the insured assets. Other experience-based data can also be collected verbally in the form of audio files. Such audio files can be loaded to the main data collection system 30. The processor 3080 in main data collection system 30 can transcribe the audio files into text files and save them in relevant databases.

Based on the above detailed structural asset automatic detection and automatic estimation methodology, insured assets/interests are scheduled and modelled in a digital environment that is saved in SANCAR central database. The model and asset schedule can be done digitally. The digitally captured raw data for each asset along with their measurement, dimensions, material type, etc., are processed by the processor 3080 in the main database 30. These processed data in the database enable the end users to create their probable maximum loss (PML) models according to the algorithms they prefer.

The second stage of the pre-binding risk inspection includes process flow/manufacturing data capturing. The process flow diagram of the insured asset can be provided by the insurer, the client, or the broker/agent earlier before the GDMCU or UAV has been deployed. Alternatively, it is can be provided during the GDMCU data collection period, and be captured by visual, audio or other methods discussed above. After completing the structural and geographical data capture, the GDMCU begin to capture the components of each process units using similar methods discussed above. If part of the process of the insured asset is not accessible from the exterior, then the UAV/Drone data capturing cannot be done. GDMCU will obtain the data inside the structures of the equipment and components of the process. Additionally, GDMCU can collect details of components manufacturing through their label, barcode, model, design details noted on the process units. If these data do not exist on the equipment, then image recognition software will check the image library of the equipment against the API database. These applications may check available search engines to find details about the equipment. The GDMCU will ask the pre-defined questions 5470 provided by SANCAR to the client's operational team. Answers are recorded and sent to the database and saved. Each process unit/component's location is captured by GPS coordinates and image recognition software. After process unit areas have been captured by GDMCU and UAV/drone, then the process diagram will be loaded to 3D model as well. End users will be able to see the augmented reality of the process diagram along with the structural 3D model of the insured asset. Structural damage simulations can project process disruption effects on the operation of the insured asset. SANCAR algorithms can then generate probable maximum loss of business interruption loss simulations.

Figure 2:
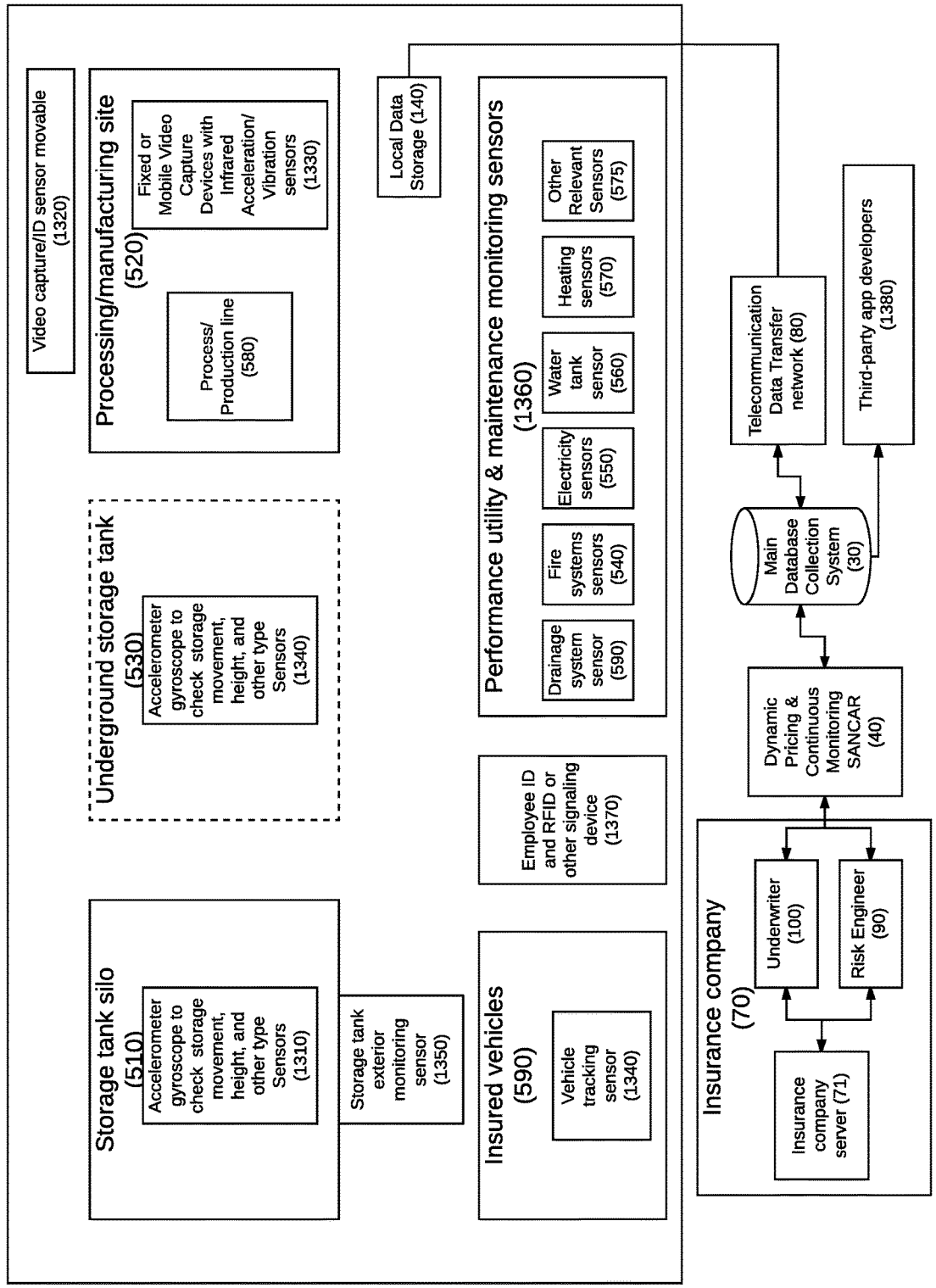
FIG. 2 shows an embodiment of a system continuous monitoring for an insured asset/interest.

FIG. 2 shows a schematic PNSN 2 (Premise Neural Sensors Network). The PNSN system can install and integrate all sensors in the insured asset to provide a continuous raw data flow to the database 30 and SANCAR 40. Based on the continuous data flow, the end users may create algorithms and applications to continuously monitor the insured asset and try to capture any anomaly using mathematical, statistical or any other advance quantitative models found in the algorithms and applications in the SANCAR platform. With these continuous monitoring and artificial intelligence, machine learning, predictive analytics based applications will decrease the likelihood of accident probability and ensure business continuity in the insured assets. When there is an event, an automatic alarm system can minimize the impact of the damage to the insured business operation.

FIG. 2 is an example within a defined insured premise/location that has process unit along with storage tanks. The figure also illustrates sensors, media capturing devices, databases, insurance company stakeholders including insurance company hardware and software infrastructure, SANCAR, third party developers. FIG. 2 also shows the continuous data feed to the SANCAR through sensors and databases.

The PNSN system can be installed based industry specific requirements provided by SANCAR in line with the business flow diagram shown in FIG. 8. According to the business activity standards, SANCAR will provide the required raw data list and also the necessary hardware and software used to capture the raw data.

The PNSN obtains data relevant to most important property damage and business interruption losses causes. Such data includes, for example, fire, pollution, terrorism, water damage, electrical short circuit, employers' liability, workers' compensation, theft, wind damage, hail damage, vehicle impact, flood, earthquake and failure to supply. The insured interest 50 is depicted as a manufacturing facility which includes an aboveground storage tank 510, an underground storage tank 530, a mobile vehicle 590, a process/manufacturing site 520, and a process/production line 580. Inside the storage tanks are sensors 1310, which can collect raw data about odor, pressure, height, movement, displacement, gas content through accelerometer, gyroscope and other type of sensors. Outside of the storage tanks are exterior monitoring sensors 1350. These sensors collect exterior conditions data which can be used for PML calculations. For underground storage tanks, the same type of sensors can be installed, and external sensors can be located at the surface of underground storage tank.

Mobile vehicles/machinery equipment can be equipped with vehicle tracking sensors 1340 which can check that these vehicles operate according to health and safety standards. In case the vehicle gets close to any structural asset or process unit, SANCAR can send an alarm signal to the driver, a nearest employee, and a risk manager of the facility.

Video capture/ID sensors moveable cameras 1320 are installed around the perimeter of the insured risk location 50, and each employee can carry a device 1370 or application which signals the ID of the employee to the PNSN. This device/application is also a receiver for notification, alarms, and messages. All visitors have to get this ID device before entering the insured risk location. This device can be made of RFID, mobile application, smart device and any other equipment that provides ID signaling and receives alarm. Moveable cameras with ID detection devices, facial recognition software or any other image processing application can monitor the moving individuals and vehicles within the premises. In the processing/production line site 520 are fixed cameras 1330 positioned at an angle to capture videos of the processing/production line units. This camera can be, for example, a light field camera, infrared, or thermal camera, etc. With the image processing through the SANCAR, the cameras capture the vibration, temperature, noise, odor, and acceleration of the components of units. Along with this raw data, the system normalizes while collecting continuous data and with statistical models, the SANCAR will monitor all parts of the processing unit during the operation based on the normalized data.

When there is an abnormal situation which is not standard routine operational process data of the equipment, SANCAR continuous risk monitoring 4020 starts a report/alarm process 4080 and notifies the related technician of that unit to verify if the situation is normal. If the employee also gives a red signal, or specialist of that unit does not respond, and anomaly data is continuously received in a period defined by SANCAR, then emergency protocol triggers and all stake holders, including the fire department, hospital, and other required government authorities 4140 are notified.

The insured risk location 50 and processing/production line site 520 can include, for example, a drainage system 590, a fire system 540, an electricity system 550, a water system (water tanks, and other pipes) 560, a heating system 570. Installed flow, voltage, pressure, and related sensors to capture the raw data enable SANCAR system to monitor and normalize the data in respect of particular insured location. This sensor is named utility performance and maintenance monitoring sensors 1360. All these sensors raw data will be transferred continuously to local sensor data collection database 140, and these data will be moved to the central database 30 through satellite, or any other data transmitting infrastructure 80. Once the continuous raw data feed reaches the main database 30, the processor 3080 will convert the raw data into a format that can be analyzed in SANCAR applications and algorithms.

All stakeholders can login the SANCAR and monitor the risk continuously through virtual reality and digital platforms. With all this data, the SANCAR dynamic pricing tool will be able to calculate daily risk premium based on the performance and operational safety of the insured location.

Figure 4:
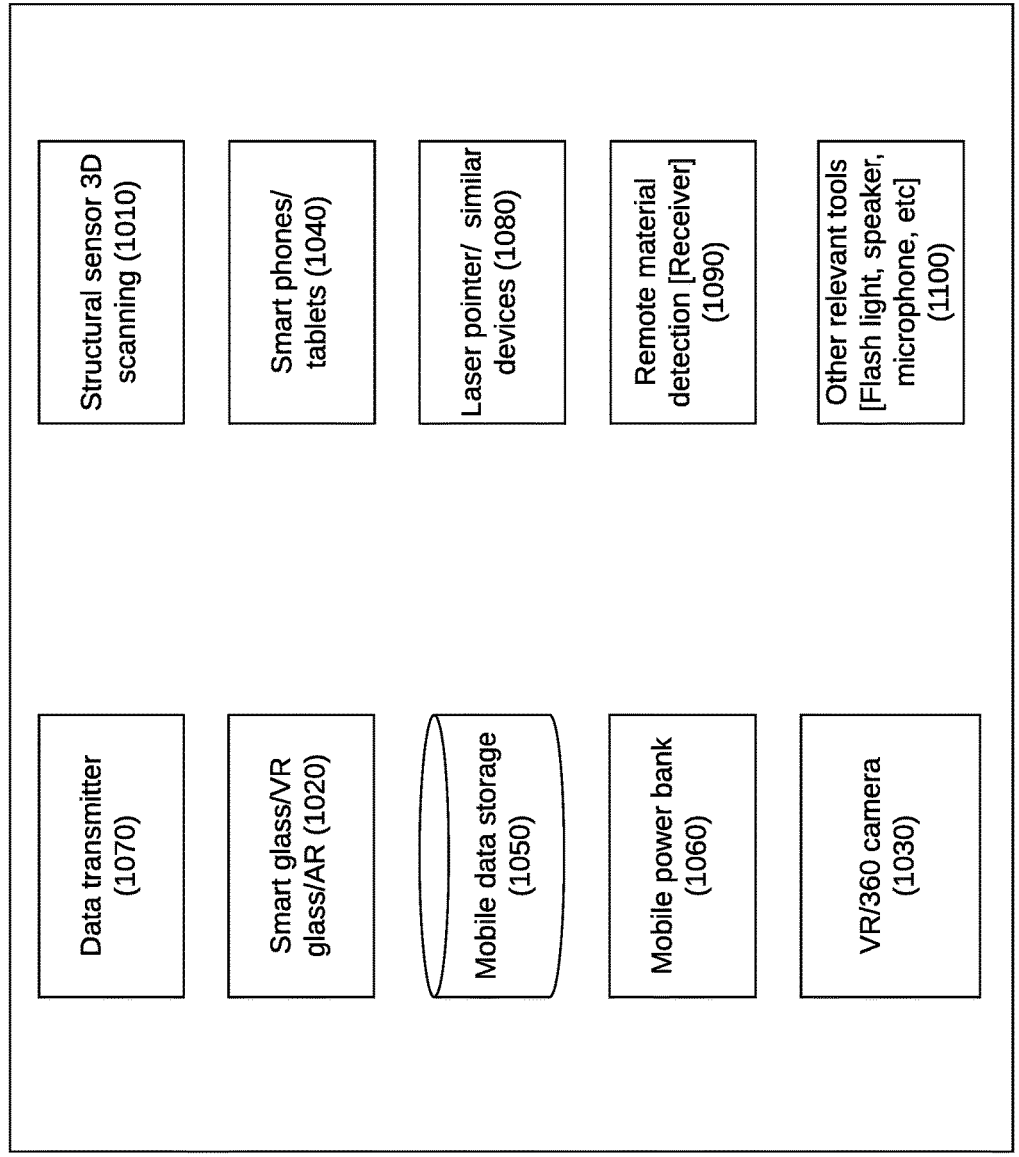
FIG. 4 shows an embodiment of a system that includes ground mobile data collection/capture unit.

FIG. 4 shows details of the ground mobile data collection unit 10 (GDMCU). This unit can be a human, a robot or a drone that is capable to move in confined spaces and collect data based on a set of defined, selected processes. The GDMCU can be equipped with devices that enable it to collect the relevant raw data. These devices and equipment can include, for example, virtual reality (VR)/360 cameras 1030, structural sensor/3D scanning devices 1010, smart phones/tablets/devices 1040, laser pointer/similar devices 1080 that can mark a specific location or an asset, remote material detection receiver 1090, smart wearables, VR & Augmented Reality glasses 1020, and other tools and devices 1100. The GDMCU can carry one or more of data transmitter 1070, mobile data storage 1050, and mobile power banks 1060 to ensure the continuity of the energy need for the devices.

Figure 5:
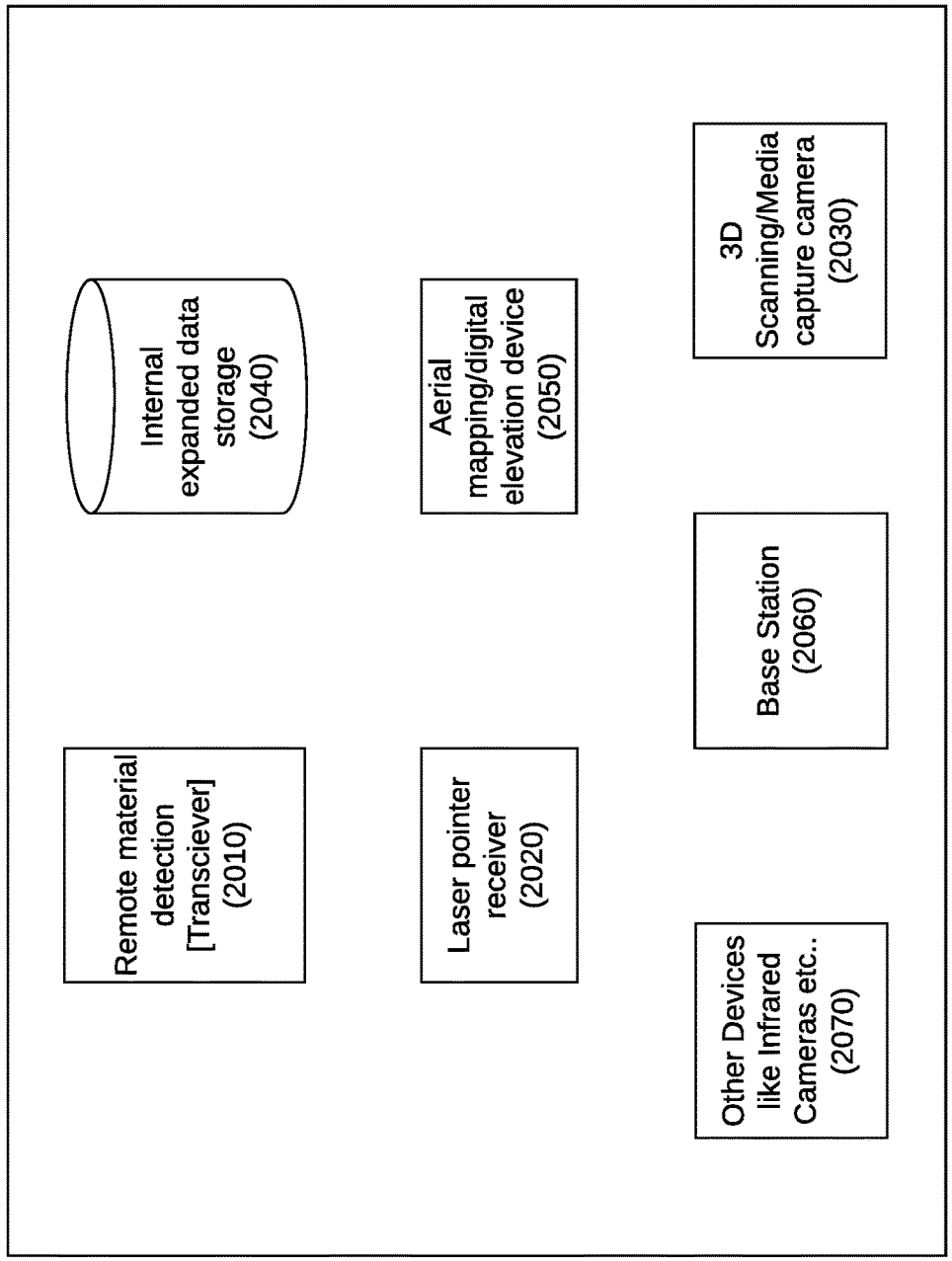
FIG. 5 shows an embodiment of a system that includes a drone for capturing real time or offline data.

FIG. 5 shows details of the UAV/Drone unit 20, which can include aircrafts as well. This unit 20 carries relevant devices and equipment to capture selected raw data from the insured risk location 50. This unit 20 can be equipped with aerial mapping/digital elevation device 2050, 3D Scanning/ Media capture camera 2030, laser pointer receiver 2020, remote material detection transceiver 2010. Other devices may be used to capture relevant raw data like infrared cameras 2070 etc. The unit 20 has internal expanded data storage 2040. There can be base station 2060 on the ground that can connect the drone 20 to the GDMCU 10, and a telecommunication data transfer network 80. So UAV/Drone 20 can continuously collect raw data and transfer this raw data to the main data collection system 30.

Figure 6:
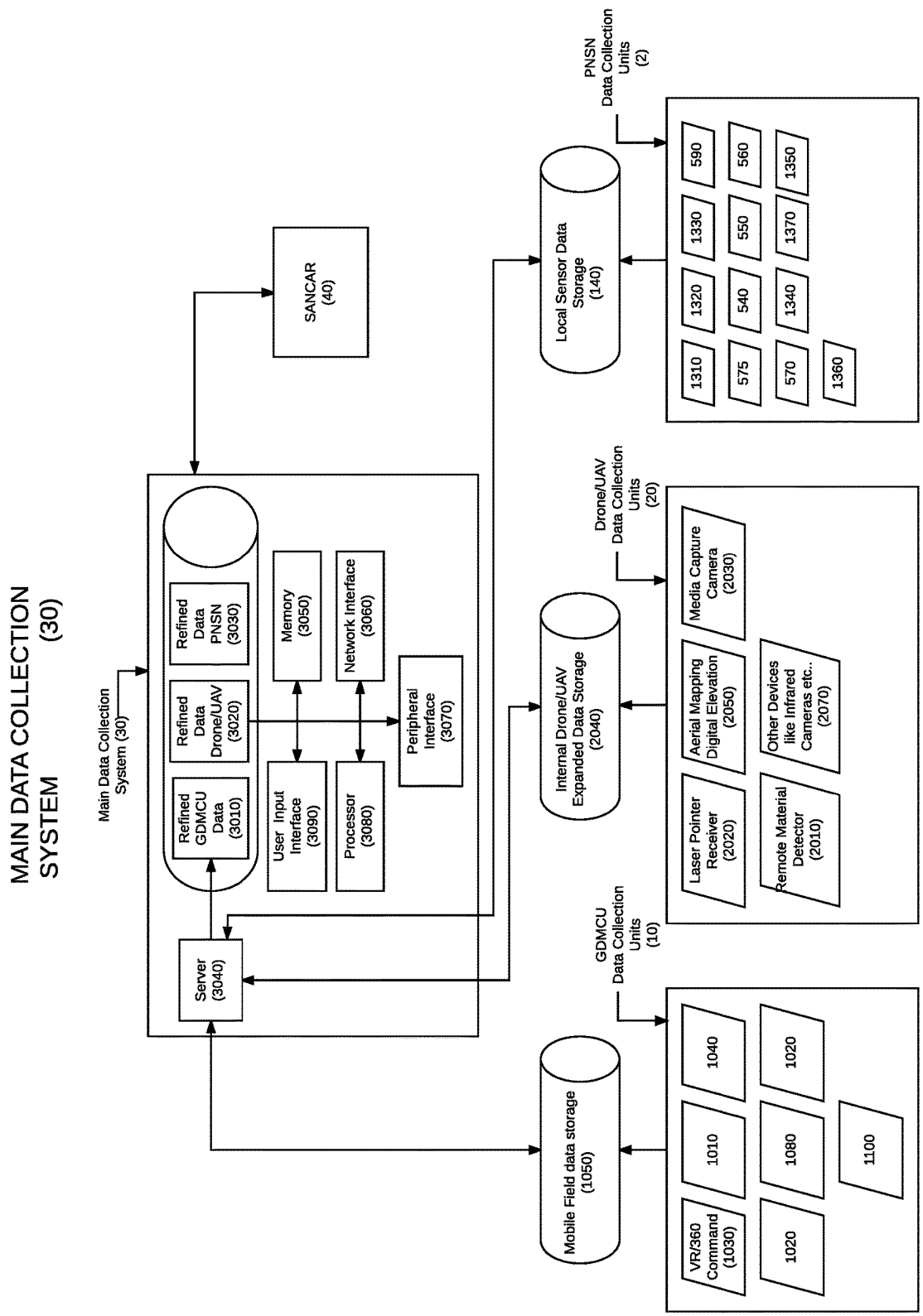
FIG. 6 shows an embodiment of a system that includes ground mobile data collection unit (GMDCU), drone/UAV and PNSN data collection and transfer to the main cloud based database system

FIG. 6 shows the flow of the raw data from various raw data providing systems to the main data collection system 30. There are three main raw data providing systems: first is the data coming from GDMCU 10, second is the Drone/ UAV 20, and third is the PNSN 2. Each sensor/media capture unit and other raw data capture units transfer the raw data to the local data storage units: Mobile field data storage unit 1050, internal drone/UAV expanded data storage 2040 and local sensor database. This raw data is transmitted to a cloud-based processor 3080 of the main data collection system 30 to process the raw data into refined data in the format that can be used for the algorithms, which are third party developed applications in the SANCAR. The refined raw data is stored in respective databases for each original source. Third party application developers 4050 and algorithms 4060 in SANCAR can access these refined databases to run their models and execute the dynamic pricing and continuous risk monitoring of the insured interest.

Figure 9:
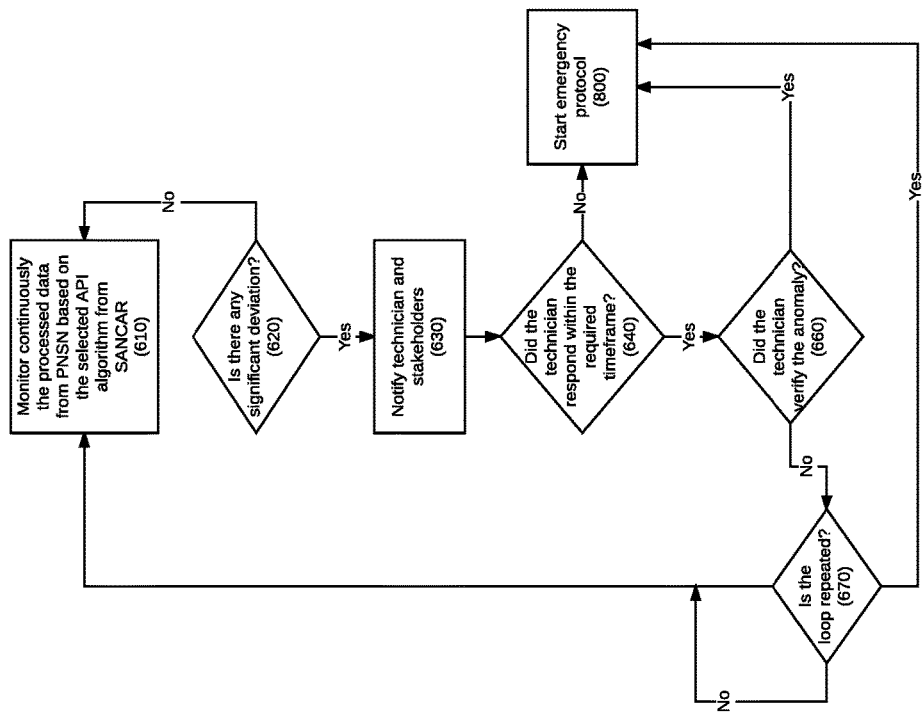
FIG. 9 shows an embodiment of a continuous monitoring process.

FIG. 9 shows a continuous process flow 600. SANCAR automatically conducts a monitoring step 610 of the insured risk location 50 using data processed by the processor 4010 and the third party developed algorithms 4060 and APIs 4050. The algorithms/applications monitor if all data flow is within typically acceptable thresholds. When there is a significant deviation as determined at a step 620, SANCAR notifies technicians 630 to that particular problem in a step 630. SANCAR sends a control signal in a step 640 if the technicians responded in defined safety period. If the technician does not respond within a designated safety period, SANCAR starts an emergency protocol at a step 800. When the technician responds on time and verifies that there is no abnormal incident in a verification step 660, then a process 670 returns to an initial monitoring stage. If the continuous monitoring process makes the above loop more than a defined number of times, the monitoring can overrule the field technician verification and starts the emergency response process 800.

Figure 3:
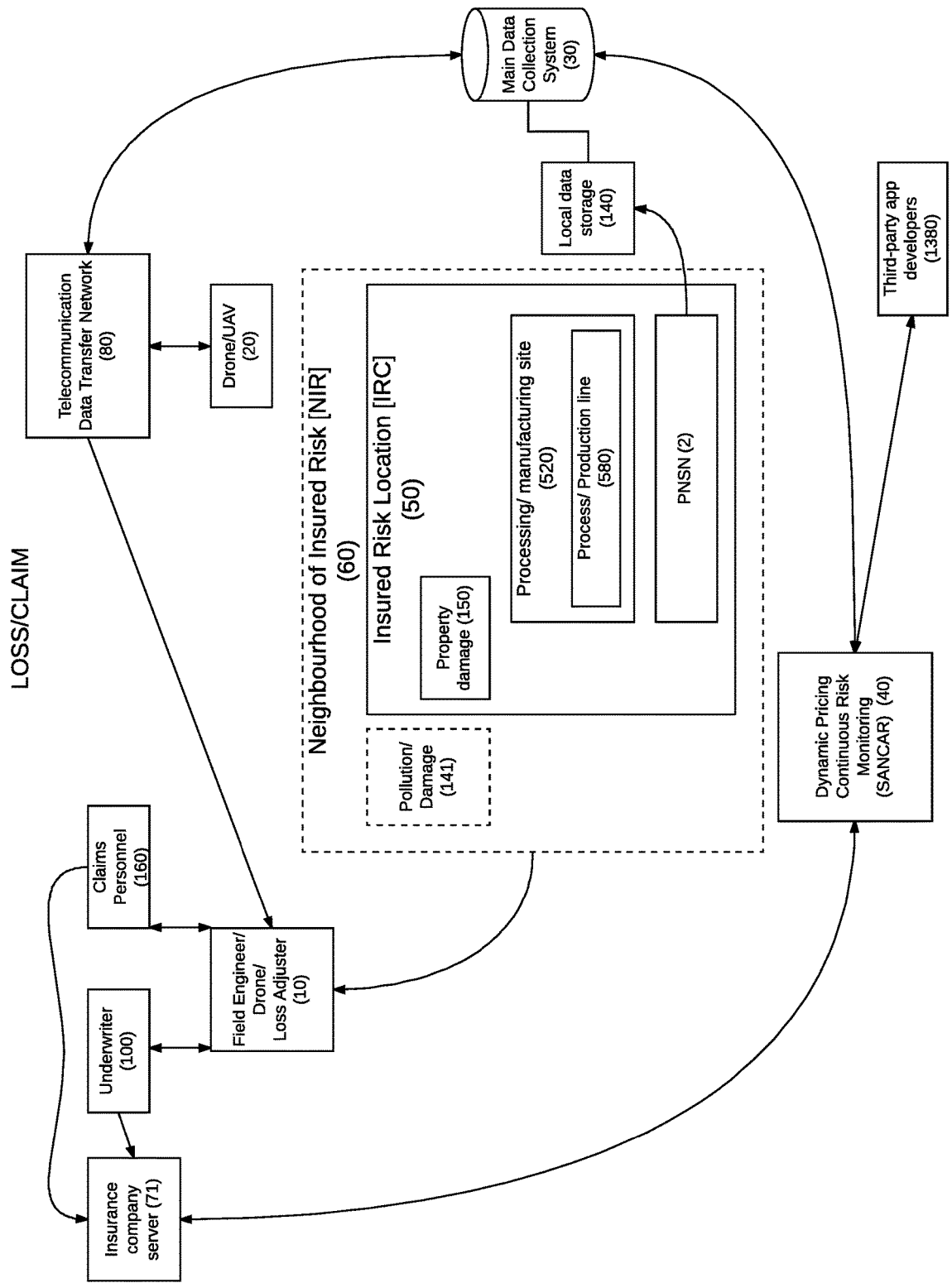
FIG. 3 shows an embodiment of a system for processing a loss scenario.

FIG. 3 shows a loss/claim process of the system. Even after SANCAR provides early notification to minimize the likelihood of a loss and impact of damage, a loss may still occur. An example of loss/claim process can involve pollution, damaged storage tanks, and damaged superstructures within which are processing units. In this figure, ground data, mobile collection unit can also include loss adjuster and any other data collection or decision making party.

Figure 10:
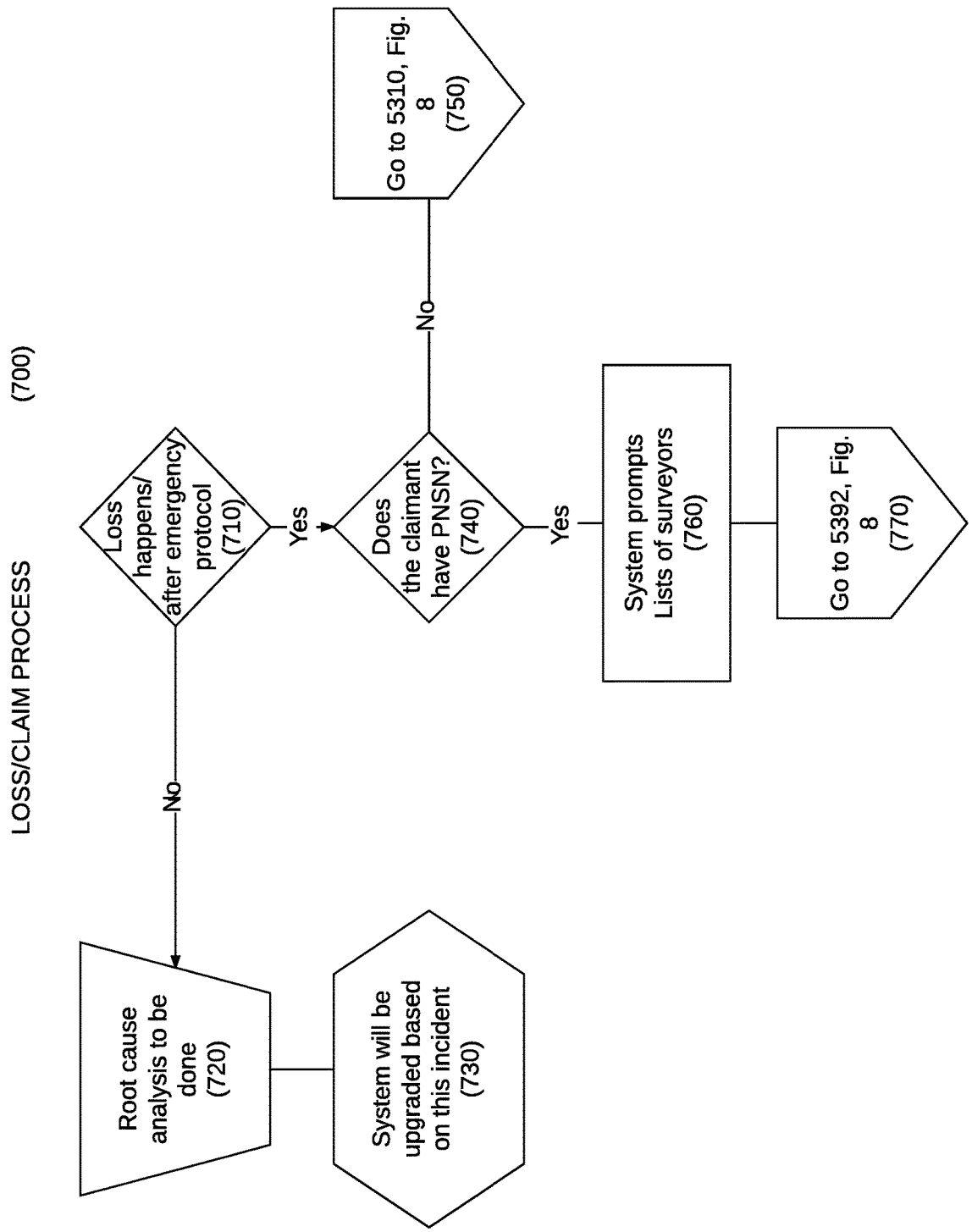
FIG. 10 shows an embodiment of a loss/claim process.

A loss/claim process 700 is illustrated in FIG. 10. In this case, SANCAR checks at a step 710 if artificial intelligence software/applications and continuous risk monitoring captured the incident and emergency protocol was triggered. If the emergency protocol was not trigger, a cause analysis is conducted, and SANCAR and PNSN systems (hardware and software) are upgraded in a step 730 to capture relevant data of this missing incident. If the emergency protocol was triggered and SANCAR predicted the loss, then SANCAR checks in a step 740, in the database memory 3050 whether the insured has PNSN. If the client does not have PSNS, the process 5310 in FIG. 8 will run to check if all stakeholders agree to install the PNSN system at the claimant risk location. When the insured has the PNSN, SANCAR provides a list of approved loss adjusters and contractors to the stakeholders 760 at a step 770, the process 5390 shown in FIG. 8 then starts.

The GDMCU 10 arrives at the loss location and integrates its system with UAV/drone 20. A similar data collection process is done by these two data collection units. The sensors of PNSN which are still functional can provide a data feed to SANCAR. SANCAR checks the initial damage report and controls the functionality of undamaged parts of the process/production line 520 of the insured location. SANCAR then provides data using augmented reality to the GDMCU and UAV/Drone to compare the initial condition and the after loss condition of the insured location. This data streaming can be seen by all other stakeholders remotely in real-time, or it can be seen later when the stakeholders log into SANCAR platform. GDMCU and UAV/drone check the potential damages neighborhood 60 area including surrounding buildings. For example, UAV/drone 20 captures data of offsite pollution 141 and calculates the affected area of pollution using image recognition software applications in SANCAR and calculating the estimated cost of cleanup based on the third party developed applications in API Database 4050.

GDMCU and UAV/Drone also capture the damaged product line/processing unit 520 and compare their after loss condition with the initial condition. Additionally, the functional part of PNSN can also provide data about the conditions of the process units. Along with this data, the SANCAR can provide predictive analytics for the potential loss of business interruption at the insured location.

SANCAR can also search the damaged process units and spare parts in the search engines and electronic sales platform, and provide estimated time of the delivery of each part. Based on the delivery time, correlation of components of process, production and installation sequence of the delivered unit, SANCAR application can estimate when the business can operate under the pre-loss condition. This type of predictive analytics, artificial intelligence, and machine learning based algorithms can minimize the delay time of claim settlements and improve the accuracy of the claim payments. Actual costs and delivery time and installation data can be automatically uploaded to the SANCAR system, allowing the system to evolve and make better predictions for future cases.

FIG. 6 shows the continuous transferring of this raw data to local data storage, database and central system servers which are converted through processor to produce data that can be used by end users and third party developers in SANCAR.

As illustrated in FIG. 7A, the data collection and transfer system 30 are shown. The primary raw data feeds of the entire system originate from the GDMCU data storage 1050, UAV/drone data storage 2040 and insured risk location data storage 1360. These raw data sources can transfer the data whenever they have enough network connectivity, and can also back up data temporarily within its own physical storage. The raw data can include mobile field data storage, drone data storage, and insured risk location/asset local data storage. The raw data moves to the server 3040, then each of this continuous data feed is stored in three primary data storage—a data field 3010, a data UAV 3020 and a data insured risk location 3030. The data collection system includes a processor 3080, a user interface 3090, a peripheral interface 3070, a network interface 3060 and a memory 3050. The processor 3080 converts the raw data into a required format by SANCAR processor 4010 through a network interface 3060 of the data collection system 30. The processed data blocks can be saved in the memory 3050 for potential future use.

SANCAR 40 does not keep raw data in its system. All raw data can be accessible through SANCAR processor 4010, and this processor populates the relevant data or transfer the command to the central data collection system processor. The required data set is processed by the data collection system processor 3080. End users of SANCAR platform can log in to the platform and launch a user interface 4150. This interface interacts with a third party API developer platform 4040, an API database/library 4050, a dynamic pricing processor 4030, a system processor 4010, an algorithm development platform 4060, an algorithm database/library 4070, a continuous risk monitoring interface 4020, and an emergency/alarm/report display functionality 4080.

End users of the SANCAR can include, for example, data analytic companies 4120, third party developers and scientists 1380, intermediaries (e.g., brokers/agents) 4110, contractors 4130, insured parties/clients 1, insurance companies 70, loss adjusters 4100, risk engineers 4090, and regulatory body/civil defense/fire department 4140.

SANCAR is an autonomous evolving structure. Insurance companies, brokers, clients may lack resources and skills to implement new technological, scientific innovations and subsequent applications of these innovations to the risk management practice. SANCAR provides initial models to calculate PML, estimate business interruption loss, and basic functionality of continuous risk monitoring. Registered technology companies/application developers 1380 can access the API developer and algorithm development platforms. They can develop applications in API development platform and register under their entity name. SANCAR can save these developed applications under API database/library 4050 for future uses. Any other developer, or end user wishing to use any of these APIs pays royalty to the original developers. SANCAR provides feedback of the APIs performance, and will also accept customer reviews. A similar system can be implemented for the algorithm development platform 4060. Recent mathematical, modelling practices can also be developed on this platform. After registration under the owner entity, the algorithms are saved in algorithm database 4070. Any other algorithm or application using any registered algorithm from the platform pays royalty to the original owner. SANCAR creates an incentive based open source platform for registered end users to continuously innovate and develop best practice risk management models and tools for risk management ecosystem.

FIG. 7B shows the components of the SANCAR platform and end users of the platform. There are two databases in the SANCAR: API Database 4050 where developed APIs stored for future use, and Algorithm Database 4070. When any end user develops API in application development platform 4040, they can save that API in the API database 4050. Processer of refined data 4010 can access the main data collection system 30 to populate relevant data sets which can help developers, scientist to develop and check the validity of their models and algorithms. End users can use the APIs and algorithms stored in SANCAR databases to monitor, price and assess the risk continuously in a dynamic environment. Once they access the user interface 4150, they can use dynamic pricing processor 4030 to see their selected APIs' and algorithms' pricing for the selected risks. To monitor the risk situation at any particular time, SANCAR displays the risk profile of the selected risks based on the selected APIs at continuous risk monitoring module 4020. SANCAR displays reports 4080 based on the predefined criteria of the API and algorithm developers which are used by the stake holders. SANCAR has algorithm development platform 4060 for scientists, mathematician or any end user to develop their mathematical and statistical models using the refined data in the main data collection system 30. These developers can use previously developed and saved algorithms from the algorithm database 4070 to develop new algorithms. SANCAR tracks the usage of the algorithms from the database to record royalties payable to the previous developers. Dynamic pricing process platform 4030 is where the pricing algorithms and APIs are executed. End user can access this platform to implement pricing algorithms and APIs for the selected risks. Development platforms of the SANCAR can access the search engines and data analytic companies databases when required to populate outside datasets for algorithm development. All of the stakeholders of the risk ecosystem can have access to the system. Examples of these stakeholders are regulators, civil defense, fire department, etc., 4140, data analytic companies 4120, third party developers 1380, brokers/agents 4110, contractors 4130, clients 1, insurance companies 70, loss adjusters 4100, and risk engineers 4090.

FIG. 8 and FIG. 9 show an example for the process flow of the pre-binding risk assessment section. The process flow demonstrates how the entire pre-binding risk phase can be automated.

Dynamic pricing processors 4030 of SANCAR can have basic pricing models designed to use the processed and stored data in the central data collection system 30, provided by GDMCU 10, UAV/drone 20, and PNSN 2. SANCAR dynamic pricing processor is improved by end users entry, and by trained data, machine learning and similar methods over time. Insurance companies, scientists, actuarial professionals can use the API library and algorithm models to establish their pricing tools and open these rating tools to the market. With dynamic pricing models and tools, each insured interest/location 50's risk can be continuously monitored and priced. Risk management industry can have continuous, integrated and evolving risk management platform that helps the insured parties to minimize their business interruption due to losses.

Over time, SANCAR evolves to provide more accurate risk premium calculation, PML, business interruption loss estimates. SANCAR also minimizes claims settlement delays by using technology and automated processes, and bringing transparency. All stakeholders in insured interest 50 can have access to real-time dataflow and can visit the insured interest 50 through the created 3D virtual reality model. The stakeholders can view several claim simulations which can be done 3D virtual reality and also other linear simulation methods. The system 40 provides continuous risk monitoring, and can help insured parties to manage their risk and keep an eye on their exposures.

FIG. 10 shows the process flow of the loss/claim process 700 within the SANCAR 40 system. Process 700 can include manual input and root cause analysis to improve the system evaluation of SANCAR 40. With this process and function the SANCAR 40 and PNSN 2 will upgraded and amended to the new information/experience obtained unforeseen loss case to avoid future miss of similar events. At a step 710, it is determined if the loss happened after the emergency protocol 800 has been triggered. If not (loss occurred and the emergency protocol was not triggered by the system), a root-cause analysis will be conducted at a step 720, and the results from that analysis will be incorporated into the system to upgrade the system based on the loss incident at a step 730.

If the loss happened after the emergency protocol was triggered, a step 740 determines if the claimant has PSNS. If not, the system will proceed to step 750 which corresponds to step S310 in FIG. 8. If the claimant has PNSN, then a step 760 is triggered and the system provides a lists of surveyors, there after the system will proceed to step 770, will corresponds to step S392 in FIG. 8.

Figure 11:
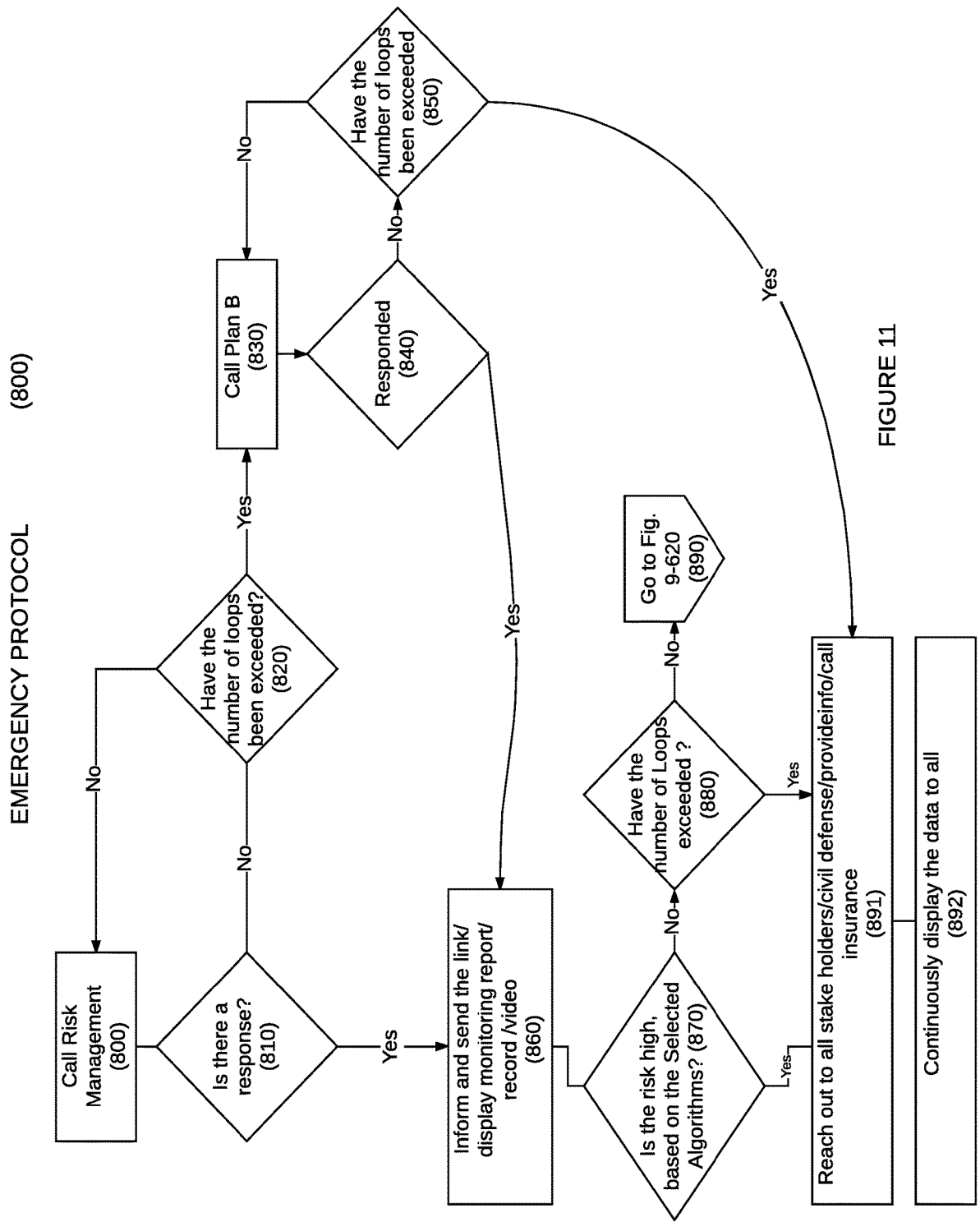
FIG. 11 shows an embodiment of an emergency protocol of the SANCAR system.

FIG. 11 shows an illustration of a process flow for emergency protocol 800 of SANCAR system. SANCAR system includes human input in the protocol 800 to minimize false alarms and reducing the probability of any resulting business interruption incidents. Once SANCAR 40 displays an alarm report 4080 based on the predefined parameters then calls/reaches risk management 802. At a step 810, the protocol determines if there has been a response. If there has not been a response, and at a step 820, the number of checking loops has been exceeded, the system will call Plan B at a step 830. At a step 840, the protocol will check if Plan B has responded. If the number of checking loop has been exceeded at a checking step 850, the system will enter step 891 where it will reach out to all stakeholders. It will also reach out to civil defense to provide information regarding the emergency and call the insurance company. The step will display all data at a step 892 to all the parties contacted at step 891. If the abnormal trend of the risk continues even when a contact person closes the red flag in the system, and if the defined number of loops is exceeded at the checking steps 850, then SANCAR 40 emergency protocol will also trigger and contact all stakeholders according to the defined parameters, in a step 891, to minimize any major failure of the business operation.

If at step 810, it has been determined that there was a response, a step 860 will follow in which information and links to display monitoring reports, recording or video will be provided. The step 840 will also proceed to the step 860. After the step 860, the system will determine at a step 870 if the risk is high, based on the selected algorithms. If it is a high risk event, step 891 will be trigger. If it is not determined to be high risk, a loop check will be conducted at a step 880. If it has been exceeded, step 891 will be trigger. If it has not been exceeded, the system will execute a step 890, which is the step 620 shown in FIG. 9.

End user 900 of the SANCAR 40 platform can include clients who want to insure their assets and/or facilities at specific locations, insurance companies, insurance brokers and agencies, loss adjusters, risk engineering companies, regulators, or civil defense, fire departments, third-party developers, data analytics companies, contractors.

While this specification contains many specific implementation details, these should not be construed as limitations on the scope of any inventions or of what may be claimed, but rather as descriptions of features specific to particular embodiments of particular inventions.

Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of embodiments of the invention have been described. Nevertheless, it will be understood that various modifications may be made without departing from the spirit and scope of the invention. Accordingly, other embodiments are within the scope of the following claims.

A number of implementations of the invention have been described. Nevertheless, it will be understood that various modifications may be made without departing from the spirit and scope of the invention. Exemplary methods of forming the aforementioned structures have been described. However, other processes can be substituted for those that are described to achieve the same or similar results. Accordingly, other embodiments are within the scope of the following claims.

What is claimed is:

1. A system comprising:
 a premise neural sensor network (PNSN) system comprising a plurality of sensors installed at an industrial facility to obtain raw PNSN data associated with the operation and/or a structural asset of the industrial facility, wherein the plurality of sensors comprise: (i) internal monitoring sensors inside the industrial facility, and (ii) external monitoring sensors outside the industrial facility, wherein the PNSN system is configured to continuously obtain the raw PNSN data from the plurality of sensors and provide the raw PNSN data for monitoring the industrial facility, and wherein the plurality of sensors are configured to generate raw PNSN data relating to one or more of odor, pressure, height, movement, displacement, and gas content at the industrial facility;

a ground mobile data capturing unit (GMDCU) configured to obtain raw GMDCU data of the structural asset at the insured industrial facility;

a flying mobile data capture unit (FDCU) configured to capture raw FDCU data of the structural asset at the insured industrial facility; and a dynamic risk pricing and continuous monitoring system at a location remote from the industrial facility comprising one or more processors, the one or more processors being programmed according to a dynamic pricing algorithm, the dynamic risk pricing and continuous monitoring system being configured to:

continuously receive an input derived from at least one of the raw PNSN data, the raw GMDCU data, and the raw FDCU data;

simulate, using the one or more processors, an incident at the industrial facility, the incident corresponding to damage to the structural asset and/or a disruption to the operation of the industrial facility;

continuously update, using the one or more processors, a value for a risk premium for the industrial facility based on the simulation and the continuously received input according to the dynamic pricing algorithm, wherein the dynamic risk pricing and continuous monitoring system is further configured to generate a daily risk premium based on the continuously updated value for the risk premium for the industrial facility;

output information based on the daily risk premium by outputting a graphical representation to a display device;

perform automated data analytics and output a probable maximum property and business interruption loss scenarios and premises based casualty exposures; and determine that an abnormal situation exists at the industrial facility based on the continuously received input and initiate an alarm.

2. The system of claim 1, wherein the graphical representation comprises an augmented reality or virtual reality graphical representation.

3. The system of claim 1, wherein the dynamic risk pricing and continuous monitoring system is further configured to determine a probable maximum loss based on the simulated incident.

4. The system of claim 1, wherein the dynamic risk pricing and continuous monitoring system further comprises a database library.

5. The system of claim 1, wherein the dynamic risk pricing and continuous monitoring system further comprises an interface configured to interact with an external developer's platform.

6. The system of claim 1, wherein the plurality of sensors of the PNSN system comprise an accelerometer or a gyroscope.

7. The system of claim 1, wherein the plurality of sensors of the PNSN system are configured to capture visual data of the structural asset.

8. The system of claim 7, wherein the dynamic risk pricing and continuous monitoring system is further programmed to convert the visual data into a measurement of dimensions of the structural asset.

* * * * *